United States Patent [19]

Shiobara et al.

[11] Patent Number: 5,300,588
[45] Date of Patent: Apr. 5, 1994

[54] THERMOSETTING RESIN COMPOSITIONS

[75] Inventors: Toshio Shiobara, Annaka; Kazutoshi Tomiyoshi, Takasaki; Hisashi Shimizu; Manabu Marumi, both of Annaka, all of Japan

[73] Assignee: Shin-Etsu Chemical Co., Ltd., Tokyo, Japan

[21] Appl. No.: 863,271

[22] Filed: Apr. 3, 1992

[30] Foreign Application Priority Data

Apr. 4, 1991 [JP] Japan .................................. 3-99554

[51] Int. Cl.$^5$ .................. C08L 63/04; C08L 63/10
[52] U.S. Cl. ............................ 525/422; 525/431; 525/476; 525/502
[58] Field of Search .................. 528/27, 97, 117; 525/476, 502, 422; 523/429, 433, 435

[56] References Cited

U.S. PATENT DOCUMENTS

| | | | |
|---|---|---|---|
| 4,130,600 | 12/1978 | Zahir et al. | |
| 4,816,531 | 3/1989 | Young | 525/488 |
| 4,902,778 | 2/1990 | Boyd | 525/431 |
| 4,962,161 | 10/1990 | Chu et al. | 525/422 |
| 5,006,614 | 4/1991 | Itoh et al. | 525/476 |
| 5,070,154 | 12/1991 | Shiobara et al. | 525/422 |

FOREIGN PATENT DOCUMENTS

| | | |
|---|---|---|
| 429667 | 6/1991 | European Pat. Off. |
| 4028845 | 3/1991 | Fed. Rep. of Germany. |
| 2355049 | 1/1978 | France. |
| 56-050900 | 12/1981 | Japan. |
| 2-189326 | 7/1990 | Japan. |
| 90/15832 | 12/1990 | World Int. Prop. O. |

*Primary Examiner*—Ralph H. Dean
*Attorney, Agent, or Firm*—Millen, White, Zelano, & Branigan

[57] ABSTRACT

A thermosetting resin composition contains (A) an imide compound having a maleimide group, (B) an epoxy resin, (C) a phenolic resin, and optionally, (D) an aromatic polymer/organopolysiloxane copolymer wherein component (B) and/or (C) has a double bond conjugated with an aromatic group and component (B) and/or (C) has a naphthalene ring. The composition is easily workable and cures to products having improved adhesion, heat resistance, low thermal expansion, and low water absorption.

8 Claims, No Drawings

THERMOSETTING RESIN COMPOSITIONS

This invention relates to a thermosetting resin composition curing to products having improved workability and heat resistance.

BACKGROUND OF THE INVENTION

Thermosetting resin compositions have been widely used as a variety of electrically insulating materials, structural materials, and adhesives by molding, casting, impregnating, laminating, and other forming techniques. Increasingly rigorous requirements are currently imposed in these applications, among which heat resistance is important.

Typical thermosetting resin compositions include polyimide and epoxy resins. The polyimide resins have satisfactory heat resistance, but are poorly workable in that they require prolonged heating at high temperatures for working. The epoxy resins modified to improve heat resistance are easily workable, but insufficient in mechanical and electrical properties at high temperatures, long-term thermal degradation resistance, and extreme heat resistant function.

Several replacements were proposed, for example, a thermosetting resin mixture comprising a polyimide and an alkenyl phenol or alkenyl phenol ether as disclosed in Japanese Patent Application KoKai (JP-A) No. 994/1977, and a heat resistant resin composition comprising a maleimide compound, a polyallylated phenol, and an epoxy resin as disclosed in Japanese Patent Publication No. 28416/1982. Since the polyallylated phenol used in the latter composition has a structure in which a polyallyl ether compound has been subject to Claisen rearrangement or Claisen rearrangement creates a phenolic hydroxyl group during heat curing, each substituting allyl group and a hydroxyl or ether group are at ortho-positions on a common aromatic ring and they would remain unreacted after curing especially in the case of novolak type resin compositions, leaving problems in cured properties and thermal degradation resistance at high temperatures.

SUMMARY OF THE INVENTION

Therefore, an object of the present invention is to provide a thermosetting resin composition which can be worked with ease and cures to products having improved heat resistance, low thermal expansion, and low water absorption.

Making investigation on a thermosetting resin composition comprising (A) an imide compound having a maleimide group of the general formula [I ] shown below, (B) a resin having at least two epoxy groups in a molecule, and (C) a resin having a phenolic hydroxy group in a molecule, the inventors have found that when either one or both of components (B) and (C) have a double bond conjugated with an aromatic group and the same or different one or both of components (B) and (C) have a naphthalene ring, this composition is improved in workability and cures to products having improved adhesion, high-temperature mechanical strength, hot water resistance, low thermal expansion, and low water absorption.

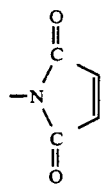

It is generally known that compounds having a maleimide group are effective for imparting heat resistance, but thermosetting resin compositions having such imide compounds blended therein are poor in long-term heat resistance, adhesion, and workability. In contrast, according to the present invention, component (B) and/or (C) having a double bond conjugated with an aromatic ring and a naphthalene ring is used in combination with an imide compound having a maleimide group. Then an unsaturated bond in the maleimide ring of the imide compound reacts with the double bond conjugated with an aromatic ring to form a copolymer. The copolymer formation, coupled with the effect of naphthalene ring included, ensures that the thermosetting resin composition has excellent properties as mentioned above.

The inventors have also found that the thermosetting resin composition comprising components (A), (B), and (C) can be reduced in stress by adding thereto a copolymer obtained by reacting an aromatic polymer with an organopolysiloxane having the compositional formula [II].

$$R_a^1 R_b^2 SiO_{(4-a-b)/2} \quad [II]$$

In formula [H], $R^1$ is a hydrogen atom, hydroxyl group, alkoxy group, or monovalent organic group containing an amino, epoxy, hydroxyl or carboxyl group, $R^2$ is a substituted or unsubstituted monovalent organic group, and letters a and b are positive numbers satisfying $0.001 \leq a \leq 1$, $1 \leq b \leq 3$, and $1.001 \leq a+b \leq 4$. The number of silicon atoms said organopolysiloxane has in its molecule is an integer of 1 to 1000. The number of functional groups represented by $R^1$ directly attached to silicon atoms of said organopolysiloxane in its molecule is an integer of at least 1.

Therefore, the present invention provides a thermosetting resin composition comprising (A) an imide compound having a maleimide group of formula [1], (B) a resin having at least two epoxy groups in a molecule, and (C) a resin having a phenolic hydroxyl group in a molecule, wherein at least one of components (B) and (C) has a double bond conjugated with an aromatic group and at least one of components (B) and (C) has a naphthalene ring. The composition may further contain (D) a copolymer obtained by reacting an aromatic polymer with an organopolysiloxane having formula [II].

DETAILED DESCRIPTION OF THE INVENTION

Component (A) in the thermosetting resin composition of the present invention is an imide compound having at least one maleimide group of formula [I].

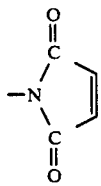

[I]

In the practice of the invention, preferred among the imide compounds are those having an N-substituted maleimide group of the following formula [III].

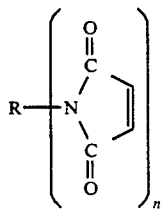

[III]

In formula [III], substituent R is an n-valent organic group, and n is an integer of from 1 to 20, preferably from 2 to 7, most preferably equal to 2.

Where n is equal to 2, the divalent organic group R is preferably selected from halogen substituted or unsubstituted divalent aliphatic hydrocarbon groups having 1 to 20 carbon atoms, halogen substituted or unsubstituted divalent aromatic hydrocarbon groups having 6 to 20 carbon atoms, halogen substituted or unsubstituted alkylene arylene groups having 7 to 20 carbon atoms, and corresponding divalent organic groups having a functional group such as an ether, thioether, sulfoxide, and sulfone group. Several illustrative examples of substituent R are given below.

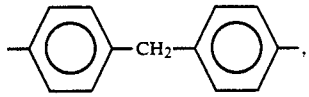

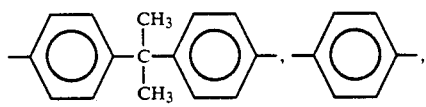

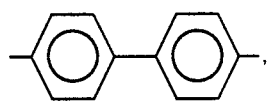

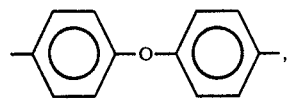

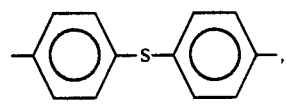

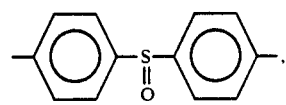

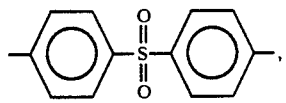

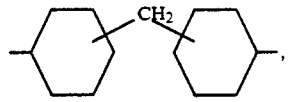

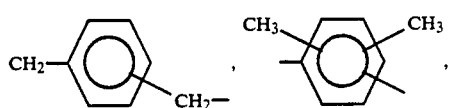

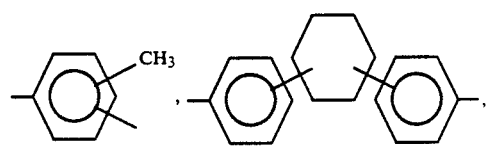

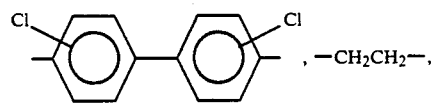

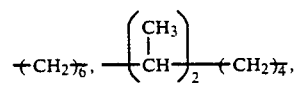

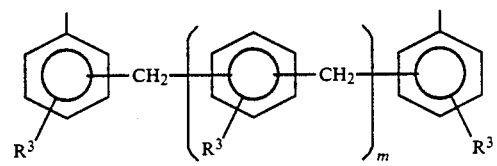

In the last formula, $R^3$ is a hydrogen atom, halogen atom or alkyl group having 1 to 4 carbon atoms, and m is an integer of from 0 to 18.

Examples of the compound having an N-substituted maleimide group include N,N'-bis-maleimides such as N,N'-diphenylmethanebis maleimide, N,N'-phenylenebismaleimide, N,N'-diphenyletherbismaleimide, N,N'-diphenyl sulfonebismaleimide, N,N'-dicyclohexyl methanebismaleimide, N,,N'-xylenebismaleimide, N,N'-tolylenebismaleimide, N,N'-xylenebismaleimide, N,N'-diphenylcyclohexanebismaleimide, N,N'-dichlorodiphenylbismaleimide, N,N'-diphenylmethanebismethylmaleimide, N,N'-diphenyletherbismethylmaleimide, N,N'-diphenylsulfonebismethylmaleimide, N,N'-ethylenebismaleimide, N,N'-hexamethylenebismaleimide, and N,N'-hexamethylenebismethylmaleimide (all inclusive of isomers); prepolymers terminated with an N,N'-bismaleimide skeleton obtained by adding these N,N'-bismaleimides to diamines; and maleimide and methylmaleimide compounds of aniline and formalin condensates.

Other useful imide compounds include compounds of the formula shown below and mixtures of an N-substituted monomaleimide, N-substituted trimaleimide or N-substituted tetrameleimide and an N-substituted bismaleimide.

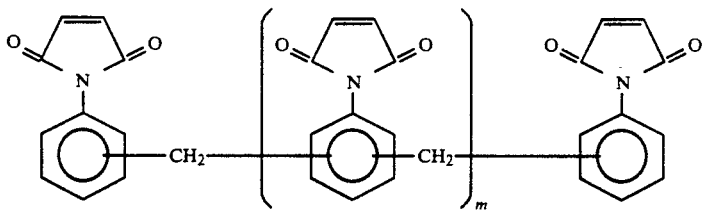

Also acceptable are the foregoing maleimide compounds modified with silicones.

In the practice of the invention, the imide compounds may be used alone or in admixture of two or more. Preferred among others are N-substituted trimaleimides and N-substituted bismaleimides, especially N,N'-diphenylmethanebismaleimide.

Component (B) is an epoxy resin having at least two epoxy groups in a molecule. Examples of the epoxy resin include bisphenol-A type epoxy resins, phenol novolak type epoxy resins, glycidyl ether type epoxy resins such as allyl phenol novolak type epoxy resins, triphenol alkane type epoxy resins and polymers thereof, naphthalene type epoxy resins, biphenyl type epoxy resins, dicyclopentadiene type epoxy resins, phenol aralkyl type epoxy resins, glycidyl ether type epoxy resins, cycloaliphatic epoxy resins, heterocyclic epoxy resins, halogenated epoxy resins, and epoxy resins having at least one double bond conjugated with an aromatic ring (e.g., substituted or unsubstituted benzene or naphthalene ring) in a molecule and at least one substituted or unsubstituted naphthalene ring in a molecule. It is preferred to use an epoxy resin having a double bond conjugated with an aromatic ring and a naphthalene ring in a molecule because the resulting thermosetting resin composition will cure to products having a low coefficient of expansion and low moisture absorption.

Illustrative, non-limiting examples of the epoxy resin having a naphthalene ring are given below.

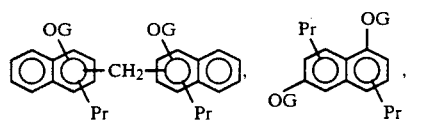

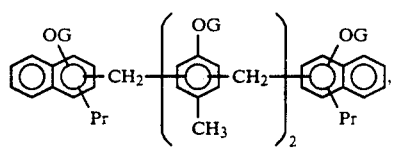

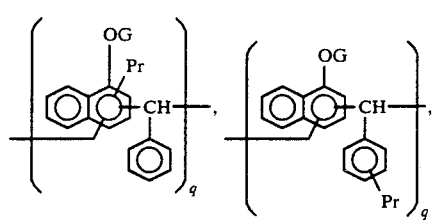

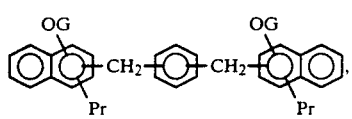

-continued

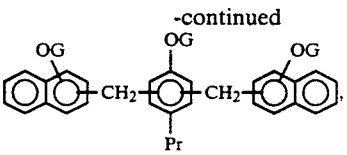

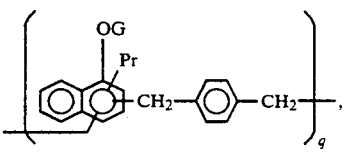

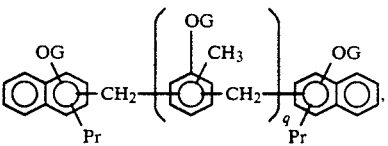

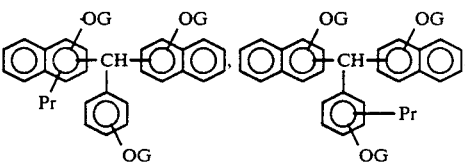

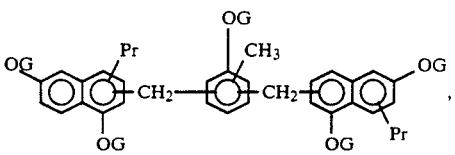

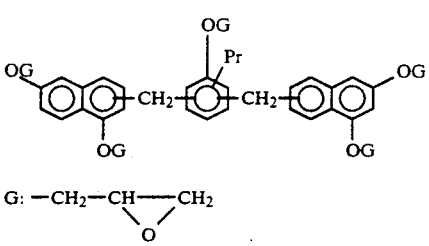

G: —CH$_2$—CH——CH$_2$
         \\O/

Pr: —CH=CH—CH$_3$ q: an integer of from 2 to 10

The epoxy resin may be used alone or in admixture of two or more.

Component (C) is a resin having a phenolic hydroxyl group in a molecule which serves as a curing agent. Included are phenolic resins such as novolak type phenolic resins, resol type phenolic resins, triphenol alkane type resins, naphthol type resins, and biphenyl type phenolic resins; and phenolic resins having at least one double bond conjugated with an aromatic ring (e.g., substituted or unsubstituted benzene or naphthalene ring) in a molecule and at least one substituted or unsubstituted naphthalene ring in a molecule. The phenolic resins may be used alone or in admixture of two or more. Preferred among these phenolic resins are phenolic resins having a double bond conjugated with an aromatic ring and a naphthalene ring in a molecule because the resulting thermosetting resin composition cures to products having a low coefficient of expansion, a high glass transition temperature (Tg), a low modulus of elasticity at temperatures above Tg, and minimal moisture absorption.

Illustrative, non-limiting examples of the phenolic resin having a naphthalene ring are given below.

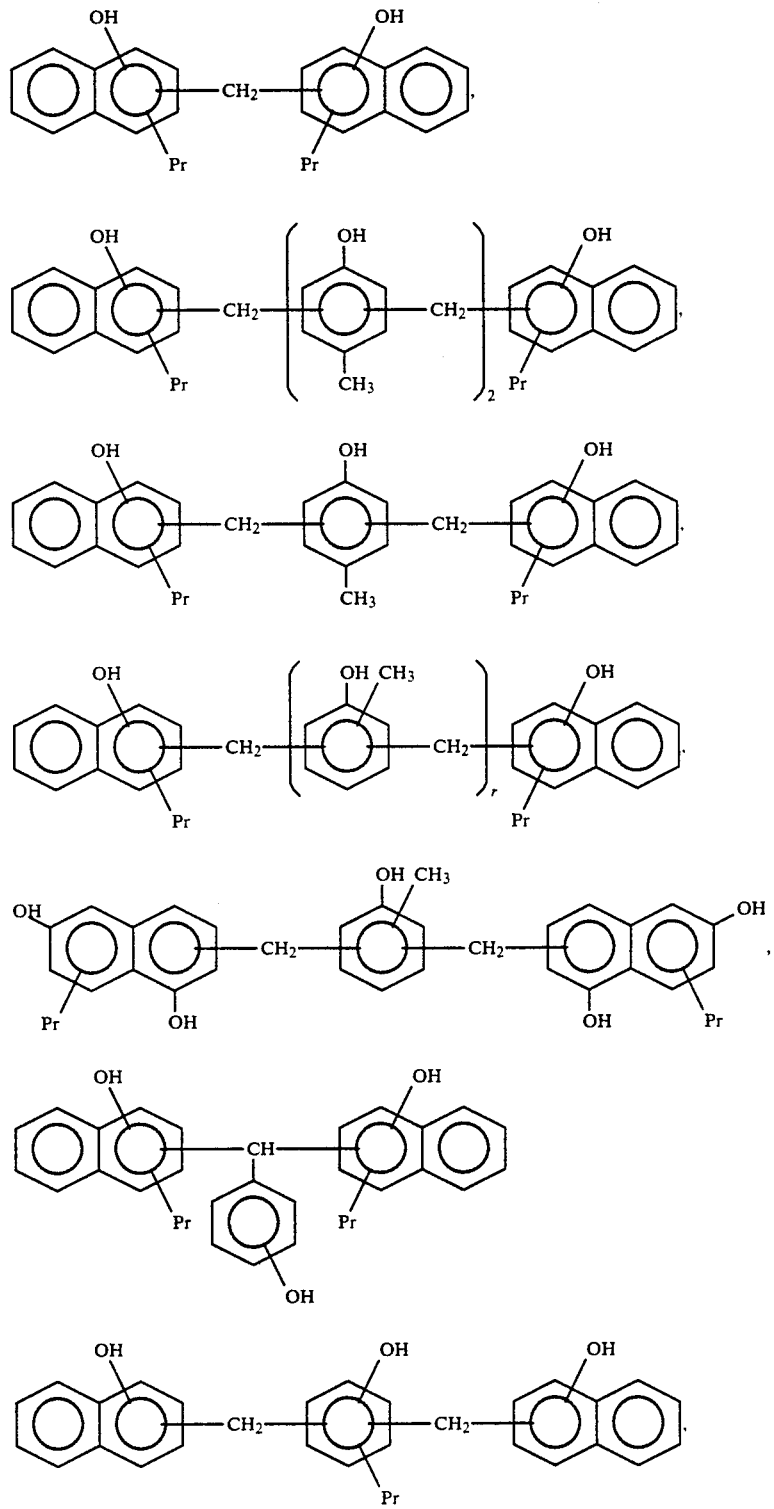

-continued

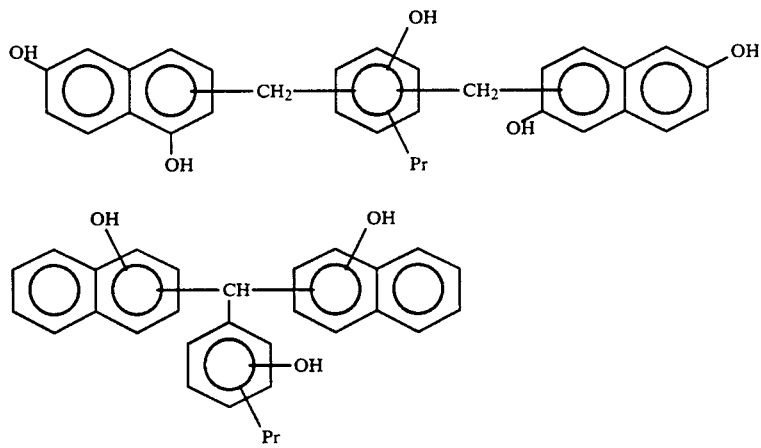

Pr: —CH=CH—CH$_3$
r : an integer of from 1 to 10

The epoxy and phenolic resins each having a double bond conjugated with an aromatic ring and a naphthalene ring in a molecule may be synthesized by conventional methods, for example, simply by reacting a phenolic resin with an allyl ether and subjecting the allyl etherified phenolic resin to Claisen rearrangement and then to isomerization.

In the composition of the invention, the total amount of components (B) and (C) blended preferably ranges from about 20 to about 400 parts, more preferably from about 50 to about 300 parts by weight per 100 parts by weight of component (A) or imide compound. Less than 20 parts of components (B) and (C) combined would sometimes result in cured products having poor workability and heat resistance whereas more than 400 parts of components (B) and (C) combined would lead to lower Tg and poor long-term heat resistance.

Desirably, components (B) and (C) contain epoxy and phenolic hydroxyl groups in such quantities that the ratio of the quantity of epoxy group (a mol) to the quantity of phenolic hydroxyl group (b mol), a/b, ranges from ½ to 3/2. Outside the range, curing property and low stress are sometimes lost.

The composition of the invention is a blend comprising components (A), (B), and (C) as defined above wherein at least one of components (B) and (C) has a double bond conjugated with an aromatic group and at least one of components (B) and (C) has a naphthalene ring. In one embodiment, either one of components (B) and (C) has a double bond conjugated with an aromatic group and the other has a naphthalene ring. Alternatively, one or both of components (B) and (C) may have both a double bond conjugated with an aromatic group and a naphthalene ring.

Preferably, the naphthalene ring, which is either substituted or unsubstituted, is contained in an amount of at least 10% by weight based on components (B) and (C) combined. With a naphthalene ring content of less than 10% by weight, the resulting cured products would be less improved in crack resistance since the moisture absorption and the modulus of elasticity in a temperature range above Tg are insufficiently reduced. With a naphthalene ring content of more than 80% by weight, problems will arise with respect to dispersion upon preparation ad moldability.

Further it is desired in the practice of the invention that the functional group ratio B'/A' range from 0.1 to 2, especially from 0.3 to 1, provided that component (A) or imide compound contains A' mol of a vinyl group and components (B) and (C) contain B' mol (in total) of a vinyl group as a double bond conjugated with an aromatic ring. If functional group ratio B'/A' exceeds 2, that is, the vinyl group as the conjugated double bond is present in a larger proportion, there would arise a curing problem that a larger portion is left unreacted, curing to less reliable products having poor long-term heat resistance. If B'/A' is less than 0.1, that is, the vinyl group as the conjugated double bond is present in a smaller proportion, there would arise problems of moldability and mechanical strength.

For imparting low stress property to the composition of the invention, it is preferred to further blend (D) a copolymer obtained by reacting an aromatic polymer with a specific organopolysiloxane.

The aromatic polymer used herein may be selected from various compounds, for example, compounds having the following structural units.

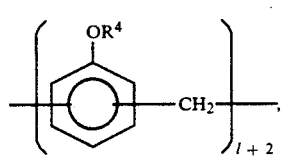

-continued
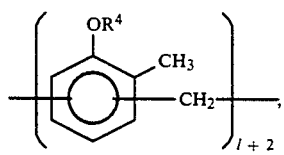
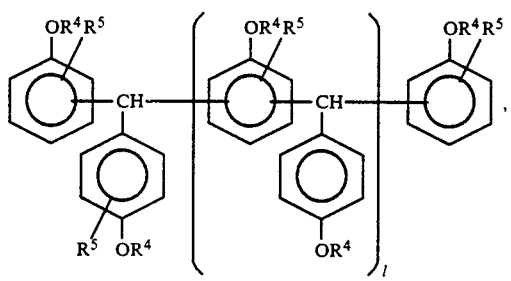
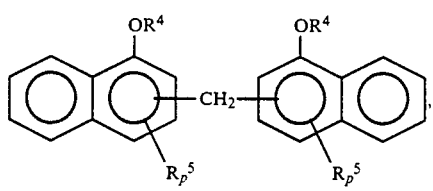
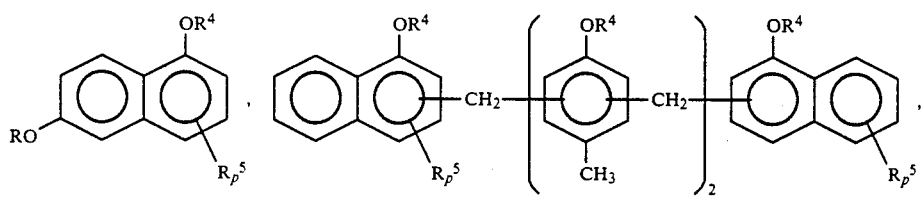
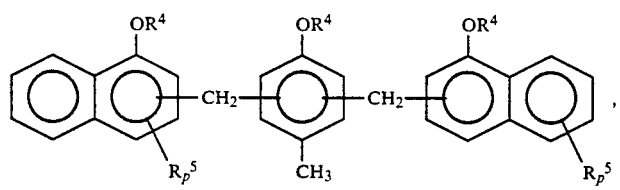
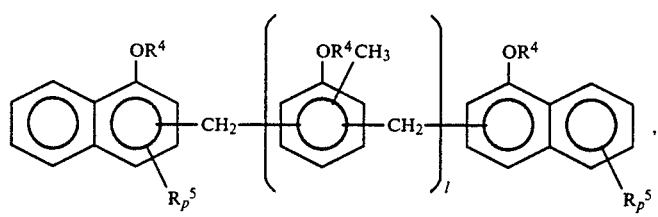
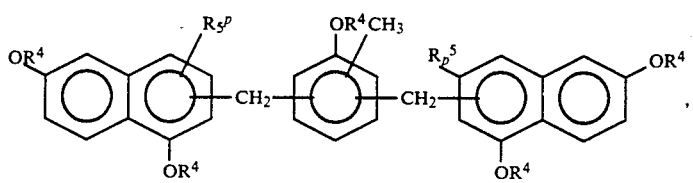

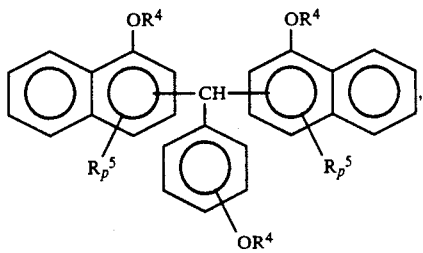
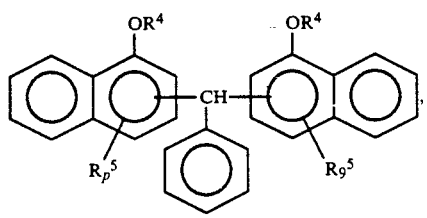
In the formulae, R⁴ is a hydrogen atom or
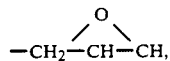
R⁵ is independently selected from alkyl groups having 1 to 10 carbon atoms, l is an integer of from 0 to 4, and p is an integer of from 0 to 2.
Other useful aromatic polymers are naphthalene resins having an alkenyl group as shown by the following formulae.
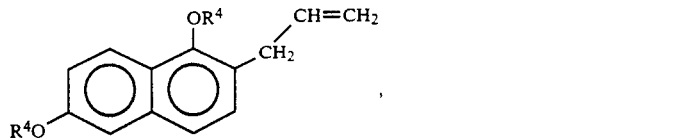
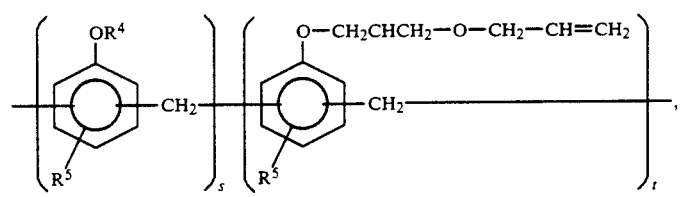
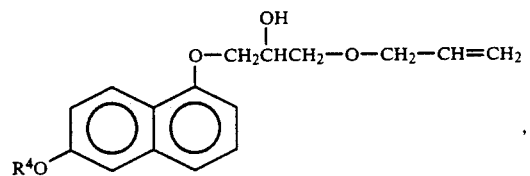
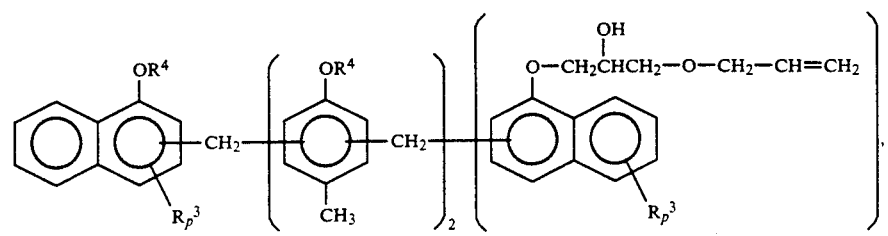

-continued

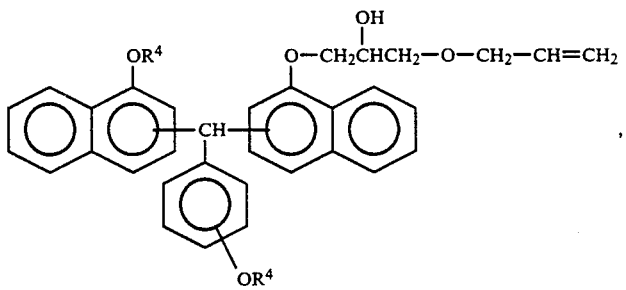

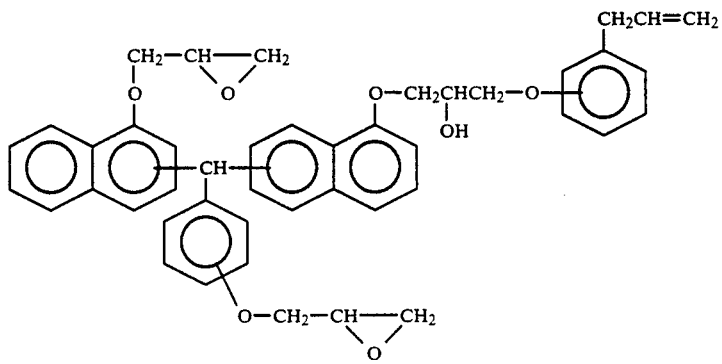

In the formulae, s and t each is an integer of from 1 to 6.

The alkenyl group-containing naphthalene resins may be synthesized by conventional methods, for example, simply by reacting a naphthalene skeleton-containing phenolic resin with allyl glycidyl ether for introducing an alkenyl group into its molecule, or by partially reacting a naphthalene skeleton-containing epoxy resin with 2-allylphenol or the like.

The other reactant, organopolysiloxane has the compositional formula [II]:

$$R_a^1 R_b^2 SiO_{(4-a-b)/2} \quad [II]$$

wherein $R^1$ is a hydrogen atom, hydroxyl group, alkoxy group, or monovalent organic group containing an amino, epoxy, hydroxyl or carboxyl group, $R^2$ is a substituted or unsubstituted monovalent organic group, and letters a and b are positive numbers satisfying $0.001 \leq a \leq 1$, $1 \leq b \leq 3$, and $1.001 \leq a+b \leq 4$. The number of silicon atoms the organopolysiloxane has in its molecule is an integer of 1 to 1000. The number of functional groups represented by $R^1$ directly attached to silicon atoms of the organopolysiloxane in its molecule is an integer of at least 1.

Examples of substituent $R^1$ include a hydrogen atom; a hydroxyl group; alkoxy groups such as methoxy, ethoxy, propoxy, isopropoxy, butoxy, methoxyethoxy, and ethoxyethoxy groups; amino group-containing organic groups such as —(CH$_2$)$_3$NH$_2$, —(CH$_2$)$_3$NHCH$_2$CH$_2$NH$_2$ and

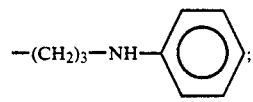

epoxy group-containing organic groups such as

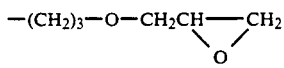

and

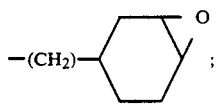

hydroxyl group-containing organic groups such as —CH$_2$OH and

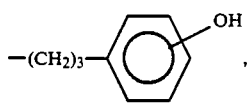

preferably organic groups containing a phenolic hydroxyl group; and carboxyl group-containing organic groups such as —(CH$_2$)$_u$—COOH wherein u is an integer of from 1 to 8.

The substituent $R^2$ is a substituted or unsubstituted monovalent organic group having 1 to 10 carbon atoms, for example, alkyl groups such as methyl, ethyl, propyl, and butyl groups; alkenyl groups such as vinyl and allyl groups; cycloalkyl groups such as cyclohexyl group; aryl groups such as phenyl and tolyl groups; aralkyl groups such as benzyl and phenylethyl groups; and substituted ones thereof in which some or all of the hydrogen atoms are replaced by halogen atoms or the like, such as chloromethyl and 3,3,3-trifluoropropyl groups.

Illustrative examples of the organopolysiloxane of formula [II] are given below.

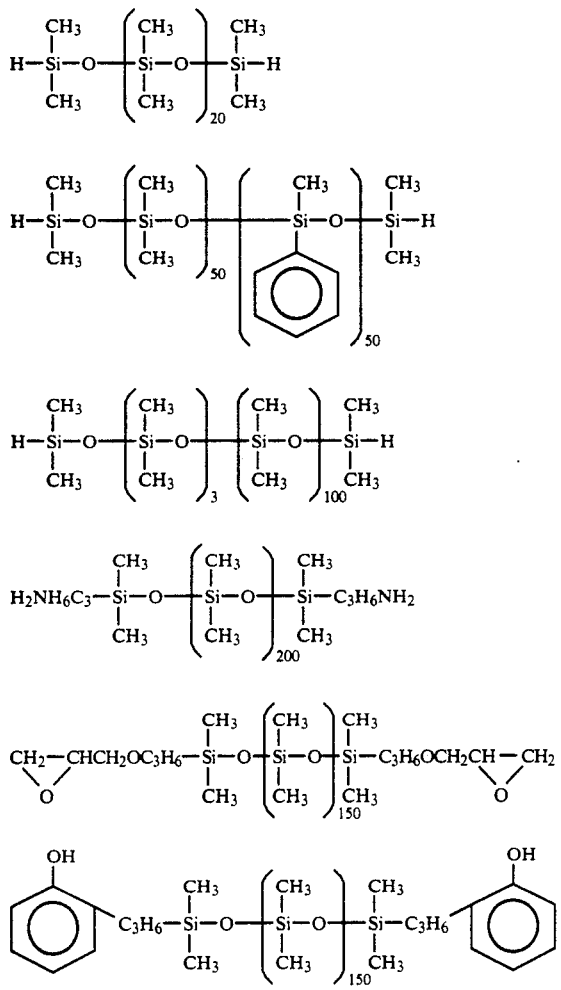

Although the molecular weight is not critical, the organopolysiloxane of formula [II] preferably has a molecular weight of about 100 to about 70,000. This molecular weight range is selected because when the aromatic polymer-organopolysiloxane copolymer is blended in the thermosetting resin composition, the copolymer is not miscible in the matrix, but forms a fine island-in-sea structure. With an organopolysiloxane molecular weight of less than 100, the resulting copolymer would not be effective for imparting flexibility or high Tg to the thermosetting resin composition when blended therein. With an organopolysiloxane molecular weight of more than 70,000, the resulting copolymer would become incompatible with the thermosetting resin composition, resulting in cured products having the copolymer separated and poor physical properties (flexural strength).

The copolymer is preferably blended in an amount of 2 to 100 parts by weight per 100 parts by weight of the total of components (A), (B) and (C). Less than 2 parts by weight may result in cured products having poor crack resistance, whereas more than 100 parts by weight may results in cured products having poor mechanical strength although the products have good crack resistance.

The copolymer between the aromatic polymer and the organopolysiloxane of formula [II] may be prepared by effecting addition reaction between them according to conventional methods. Addition reaction between the aromatic polymer and the organopolysiloxane of formula [II] is preferably effected in an inert solvent such as benzene, toluene, and methyl isobutyl ketone using a catalytic amount of any desired one of well-known addition catalysts, for example, platinum catalysts, typically chloroplatinic acid. The reaction temperature is not critical although a temperature of about 60° to 120° C. is preferred. Usually, reaction continues for about 30 minutes to about 24 hours. Copolymers between an aromatic polymer and an aminopolysiloxane or epoxypolysiloxane may be obtained by reacting the reactants at room temperature or elevated temperature. A suitable solvent such as methyl isobutyl ketone, toluene, dioxane and methyl cellosolve is desirably used in order to mix the reactants uniformly or nearly uniformly. For promoting the reaction, water, alcohols such as butanol, isopropyl alcohol and ethanol, and phenols may be used. It is also desirable to use reaction catalysts, for example, amines such as tributyl amine and 1,8-diazabicycloundecene-7, organic phosphines such as triphenylphosphine, and imidazoles such as 2-phenylimidazole.

In order to complete the crosslinkage between the imide compound having a maleimide group of formula [1] and a resin having a double bond conjugated with an aromatic group, a curing catalyst is preferably blended in the composition of the invention. Useful curing catalysts are organic peroxides including benzoyl peroxide, para-chlorobenzoyl peroxide, 2,4-dichlorobenzoyl peroxide, capryl peroxide, lauroyl peroxide, acetyl peroxide, methyl ethyl ketone peroxide, cyclohexanone peroxide, bis(1-hydroxycyclohexyl peroxide), hydroxyheptyl peroxide, tert-butyl hydroperoxide, p-methane hydroperoxide, cumene hydroperoxide, di-tertbutyl peroxide, dicumyl peroxide, 2,5-dimethyl-2,5-di(tert-butyl peroxide) hexane, 2,5-dimethylhexyl-2,5-di(peroxybenzoate), tert-butyl perbenzoate, tert-butyl peracetate, tert-butyl peroctoate, tert-butyl peroxyisobutyrate, and di-tert-butyl diperphthalate alone and mixtures thereof.

Further, it is preferred to use various curing promoters for the purpose of promoting the reaction between the curing catalyst and the resins. Useful curing promoters include organic phosphines, for example, triphenyl phosphine, tricyclohexyl phosphine, tributyl phosphine, methyl diphenyl phosphine, 1.2-bis(diphenylphosphino)ethane, and bis(diphenylphosphino)methane; tertiary amines, for example, 1,8-diazabicyclo[5.4.0]undecene-7; and imidazoles. They may be used alone or in admixture of two or more insofar as the objects of the invention are not impaired.

The curing catalyst and curing promoter are used in a total amount of about 0.01 to 10 parts, especially about 0.1 to 2 parts by weight per 100 parts by weight of components (A), (B), (C) and (D) combined. A catalyst and promoter amount of less than 0.01 parts is not effective for curing promotion whereas more than 10 parts of the catalyst and promoter would cause the composition to cure too fast and adversely affect its moldability.

If desired, the composition of the invention may further contain an inorganic filler. The inorganic filler is selected from fillers commonly blended in thermosetting resin compositions, for example, silicas such as fused silica and crystalline silica, alumina, carbon black, mica, clay, kaolin, glass beads, glass fibers, aluminum nitride, silicon carbide, zinc oxide, antimony trioxide, calcium carbide, aluminum hydroxide, berllium oxide, boron nitride, titanium oxide, silicon carbide, and iron oxide.

These inorganic fillers may be used alone or in admixture of two or more. The filler is preferably used in an amount of about 100 to about 1,000 parts, especially abut 200 to about 700 parts by weight per 100 parts by weight of the total of components (A), (B), (C), and (D) although the filler content is not particularly limited.

The composition of the invention may further contain various well-known additives if desired. Exemplary additives include thermoplastic resins, thermoplastic elastomers, organic synthetic rubbers, silicone gel or cured silicone rubber powder; mold release agents such as waxes (e.g., carnauba wax) and fatty acids (e.g., stearic acid) and metal salts thereof; pigments such as carbon black, cobalt blue, and red iron oxide; flame retardants such as antimony oxide and halides; surface treating agents such as silanes (e.g., γ-glycidoxypropyltrimethoxysilane); coupling agents such as epoxy silanes, vinyl silanes, boron compounds and alkyl titanates; antioxidants; other additives, and mixtures thereof.

The thermosetting resin compositions of the invention may be prepared by mixing and agitating predetermined amounts of the necessary components uniformly, and milling the mixture in milling means preheated at 70° to 950° C., for example, a kneader, roll mill and extruder, followed by cooling and comminution. The order of mixing the components is not critical.

The compositions of the invention are advantageously applicable as molding materials, powder coating materials, and adhesives. The compositions are also useful in encapsulating various semiconductor devices including IC, LSI, transistors, thyristors and diodes and manufacturing printed circuit boards.

The thermosetting resin compositions of the invention comprising the specific components in admixture as defined above cure into low stressed products having improved adhesion and workability, mechanical strength at elevated temperatures, hot water resistance, heat resistance and low water absorption. Therefore, the compositions meet the current service requirements of thermosetting resin compositions and are useful as various electrically insulating materials, structural materials, adhesives, powder coating materials, and semiconductor encapsulants.

EXAMPLE

Examples of the present invention are given below together with comparative examples, by way of illustration and not by way of limitation. All parts are by weight.

EXAMPLES 1-15 AND COMPARATIVE EXAMPLES 1-6

Twenty one (21) thermosetting resin compositions were prepared by uniformly melt mixing the following components in a hot two-roll mill. The components used were 30 parts of N,N'-4,4'-diphenylmethanebismaleimide, an epoxy resin and a phenolic resin both shown below and used in the amounts shown in Tables 1 to 3, triphenylphosphine and dicumyl peroxide curing catalysts in the amounts shown in Tables 1 to 3, 260 parts of quartz powder, 1.5 parts of γ-glycidoxypropyltrimethoxysilane, 1.5 parts of wax E, and 1.0 part of carbon black.

These compositions were examined by the following tests (A) to (F). The results are shown in Tables 1 to 3.

(A) Spiral Flow

Using a mold according to the EMMI standard, measurement was made at 175° C. and 70 kg /cm$^2$.

(B) Flexural Strength and Flexural Modulus

Test bars of 10×4×100 mm which were molded at 180° C. and 70 kg/cm$^2$ for 2 minutes and post cured at 180° C. for 4 hours were tested at 215° C. according to JIS K6911.

(C) Coefficient of Linear Expansion and ($\alpha$) and Glass Transition Temperature (Tg)

Using a dilatometer, test pieces of 4 mm in diameter and 15 mm long were examined by heating the test pieces at a rate of 5° C./min.

(D) Crack Resistance Upon Soldering After Moisture Absorption

Silicon chips of 2×6×0.3 mm were bonded to SO package frames of 4×12×1.8 mm and then encapsulated with the thermosetting resin compositions by molding at 175° C. for 2 minutes and post curing at 180° C. for 4 hours. The packages were allowed to stand in a hot humid atmosphere at 85° C. and RH 85% for 24 and 48 hours and then immersed for 10 seconds in a solder bath at 240° C. Then the packages were disintegrated to observe the occurrence of internal cracks. Reported is the number of cracked packages/the total number of packages tested.

(E) Moisture Resistance

4-M DRAM chips were bonded to SOJ frames with 20 pins and then encapsulated with the thermosetting resin compositions by molding at 180° C. for 2 minutes and post curing at 180° C. for 4 hours. The packages were allowed to stand for 24 hours in a hot humid atmosphere at 121° C. and RH 100%, then dipped for 10 seconds in a solder bath at 260° C., and again allowed to stand for 300 hours in a hot humid atmosphere at 121° C. and RH 100%. Reported is the number of Al wire broken packages/the total number of packages tested.

(F) Water Absorption

Disks of 50 mm in diameter and 3 mm thick were molded at 180 ° C. and 70 kg/cm$^2$ for 2 minutes and post cured at 180° C. for 4 hours. The disks were subjected to a pressure cooker test (PCT) at 121° C./100% RH for 24 hours before the water absorption (percent) was measured.

| Epoxy resin | Epoxy equiv. | Softening point (°C.) |
| --- | --- | --- |

-continued (1) [structure: naphthalene-OG with Pr, connected via CH₂ to cresol (CH₃, OG), connected via CH₂ to naphthalene-OG with Pr] (designated Compound I) — 232, 90

(2) [structure: naphthalene with Pr, OG, OG, Pr substituents] — 188, 80

(3) [structure: naphthalene-OG, CH₂, phenyl-OG with Pr, CH₂, naphthalene-OG] — 176, 85

(4) [structure: repeating unit of phenyl with OG, CH₃, CH₂, Pr]$_{n'}$ — 239, 70

(5) Cresol novolak type epoxy resin EOCN-1020-65 (Nihon Kayaku K.K.) — 198, 65

(6) Brominated epoxy resin BREN-S (Nihon Kayaku K.K.) — 280, 80

(7) [complex structure with naphthalene-OG, CH₂, phenyl-OG (CH₃), CH₂, naphthalene with OCH₂CH(OH)CH₂O(CH₂)₃— linked to siloxane (Si(CH₃)₂—[OSi(CH₃)₂]₈₀—(CH₂)₃OCH₂CH(OH)CH₂O)— linked to naphthalene-CH₂-phenyl(CH₃,OG)-CH₂-naphthalene-OG] — 1800, 95

-continued
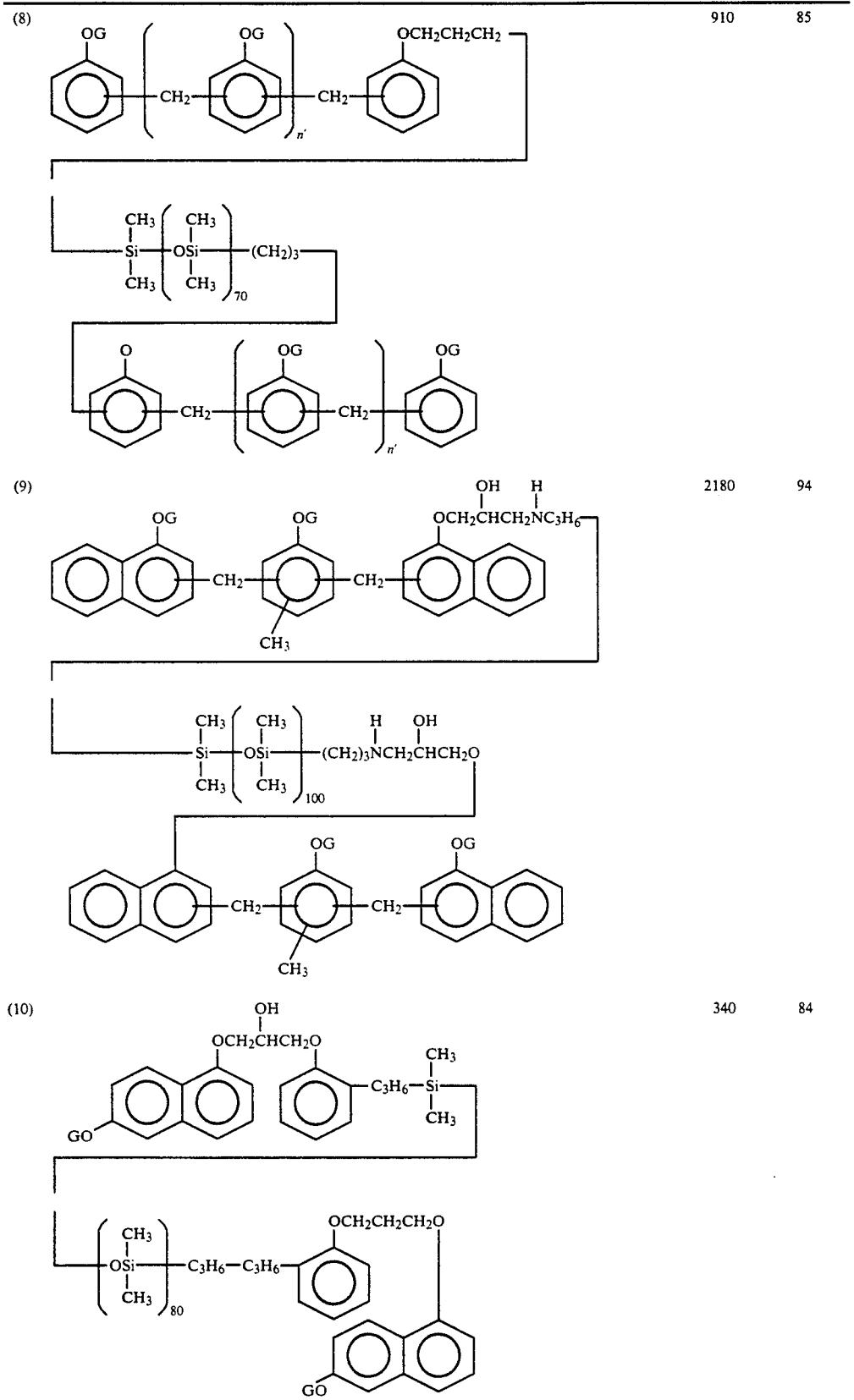
| | | |
|---|---|---|
| (8) | 910 | 85 |
| (9) | 2180 | 94 |
| (10) | 340 | 84 |
G is —CH₂CH—CH₂, Pr is —CH=CH—CH₃,
        \\_O_/

-continued n' is 3 on average.

| | | OH equiv. |
|---|---|---|
| | Phenolic resin | |
| (11) | [structure: two naphthalene units with OH and Pr groups connected via CH₂ to a central methylphenol with OH and CH₃] (designated Compound H) | 169 |
| (12) | [structure: naphthalene-OH-Pr — CH₂ — (methylphenol-OH-CH₃ — CH₂)₂ — naphthalene-OH-Pr] | 149 |
| (13) | [structure: dihydroxynaphthalene-Pr — CH₂ — methylphenol(OH,CH₃) — CH₂ — dihydroxynaphthalene-Pr] | 101 |
| (14) | [structure: two naphthalene-OH-Pr groups connected by CH to a phenol-OH-Pr] | 166 |
| (15) | [structure: repeating phenol unit with OH, Pr, and CH₂, subscript n] | 150 |
| (16) | Phenol novolak resin KH3488 (Dai-Nihon Ink K.K.) | 110 |

Pr is —CH=CH—CH₃ and n is 2 to 7.

TABLE 1

| | Example | | | | | Comparative Example | | |
|---|---|---|---|---|---|---|---|---|
| | 1 | 2 | 3 | 4 | 5 | 1 | 2 | 3 |
| N-N'-4,4'-diphenylmethanebismaleimide | 30 | 30 | 30 | 30 | 30 | 30 | 30 | — |
| Epoxy resin (1) | 12.3 | 42.5 | — | 35.6 | — | — | — | — |
| Epoxy resin (2) | — | — | 39.7 | — | — | — | — | — |
| Epoxy resin (3) | — | — | — | — | 38.7 | — | — | — |
| Epoxy resin (4) | 30.7 | — | — | — | — | 42.9 | 36.5 | 53.2 |
| Epoxy resin (6) | 6.0 | 6.0 | 6.0 | 6.0 | 6.0 | 6.0 | 6.0 | 6.0 |
| Phenolic resin (11) | — | — | — | 28.2 | — | — | — | 40.8 |
| Phenolic resin (15) | — | — | — | — | — | — | 7.5 | — |
| Phenolic resin (16) | 21.0 | 21.5 | 24.3 | — | 25.3 | 21.1 | — | — |
| Triphenyl phosphine | 1.0 | 1.0 | 1.0 | 1.0 | 1.0 | 1.0 | 1.0 | 1.0 |
| Dicumyl peroxide | 0.4 | 0.4 | 0.4 | 0.4 | 0.4 | 0.4 | 0.4 | — |
| Spiral flow, inch | 33 | 32 | 34 | 33 | 35 | 34 | 31 | 32 |
| Flexural strength, kg/mm² | 3.2 | 3.4 | 3.1 | 3.3 | 3.4 | 1.7 | 2.0 | 2.1 |
| Flexural modulus. kg/mm² | 198 | 205 | 201 | 202 | 204 | 220 | 212 | 215 |
| Tg, °C. | 210 | 225 | 225 | 230 | 227 | 190 | 215 | 170 |

TABLE 1-continued

|  |  | Example | | | | | Comparative Example | | |
|---|---|---|---|---|---|---|---|---|---|
|  |  | 1 | 2 | 3 | 4 | 5 | 1 | 2 | 3 |
| $\alpha$, $10^{-5}$/°C. | | 1.61 | 1.60 | 1.62 | 1.61 | 1.63 | 1.81 | 1.79 | 1.80 |
| Crack resistance | 85° C./85% RH 24 hr. | 0/20 | 0/20 | 0/20 | 0/20 | 0/20 | 20/20 | 20/20 | 12/20 |
|  | 85° C./85% RH 48 hr. | 0/20 | 0/20 | 0/20 | 0/20 | 0/20 | — | — | — |
| Moisture resistance | | 0/40 | 0/40 | 0/40 | 0/40 | 0/40 | 40/40 | 40/40 | 30/40 |
| Water absorption, % | | 0.51 | 0.52 | 0.53 | 0.49 | 0.52 | 0.71 | 0.70 | 0.55 |

TABLE 2

|  |  | Example | | | | | | | |
|---|---|---|---|---|---|---|---|---|---|
|  |  | 6 | 7 | 8 | 9 | 10 | 11 | 12 | 13 |
| N-N'-4,4'-diphenylmethanebismaleimide | | 30 | 30 | 30 | 30 | 30 | 30 | 30 | 30 |
| Epoxy resin (1) | | 35.3 | 27.9 | 29.1 | 35.0 | 35.3 | 35.4 | 31.3 | 36.3 |
| Epoxy resin (6) | | 6.0 | 6.0 | 6.0 | 6.0 | 6.0 | 6.0 | 6.0 | 6.0 |
| Epoxy resin (7) | | 10 | — | 10 | — | — | — | 10 | 10 |
| Epoxy resin (8) | | — | 11 | — | 11 | — | — | — | — |
| Epoxy resin (9) | | — | — | — | — | 10 | — | — | — |
| Epoxy resin (10) | | — | — | — | — | — | 10 | — | — |
| Phenolic resin (11) | | — | 25.1 | 24.9 | — | — | — | — | — |
| Phenolic resin (12) | | — | — | — | — | — | — | 22.9 | — |
| Phenolic resin (13) | | — | — | — | — | — | — | — | 17.7 |
| Phenolic resin (16) | | 18.7 | — | — | 18.5 | 18.7 | 18.6 | — | — |
| Triphenyl phosphine | | 1.0 | 1.0 | 1.0 | 1.0 | 1.0 | 1.0 | 1.0 | 1.0 |
| Dicumyl peroxide | | 0.4 | 0.4 | 0.4 | 0.4 | 0.4 | 0.4 | 0.4 | 0.4 |
| Spiral flow, inch | | 31 | 30 | 32 | 31 | 30 | 31 | 29 | 32 |
| Flexural strength, kg/mm$^2$ | | 3.2 | 3.4 | 3.1 | 3.3 | 3.2 | 3.0 | 3.1 | 3.0 |
| Flexural modulus, kg/mm$^2$ | | 118 | 135 | 128 | 122 | 125 | 119 | 118 | 125 |
| Tg, °C. | | 210 | 220 | 220 | 215 | 218 | 221 | 220 | 221 |
| $\alpha$, $10^{-5}$/°C. | | 1.40 | 1.40 | 1.42 | 1.41 | 1.41 | 1.42 | 1.40 | 1.42 |
| Crack resistance | 85° C./85% RH 24 hr. | 0/20 | 0/20 | 0/20 | 0/20 | 0/20 | 0/20 | 0/20 | 0/20 |
|  | 85° C./85% RH 48 hr. | 0/20 | 0/20 | 0/20 | 0/20 | 0/20 | 0/20 | 0/20 | 0/20 |
| Moisture resistance | | 0/40 | 0/40 | 0/40 | 0/40 | 0/40 | 0/40 | 0/40 | 0/40 |
| Water absorption, % | | 0.58 | 0.52 | 0.50 | 0.55 | 0.56 | 0.53 | 0.51 | 0.52 |

TABLE 3

|  |  | Example | | Comparative | | |
|---|---|---|---|---|---|---|
|  |  | 14 | 15 | 4 | 5 | 6 |
| N-N'-4,4'-diphenylmethanebismaleimide | | 30 | 30 | 30 | — | — |
| Epoxy resin (1) | | 29.6 | 31.1 | — | — | — |
| Epoxy resin (3) | | — | — | — | 50.2 | — |
| Epoxy resin (4) | | — | — | 33.5 | — | 53.1 |
| Epoxy resin (6) | | 6.0 | 6.0 | 6.0 | 6.0 | 6.0 |
| Epoxy resin (7) | | 10 | 10 | 10 | 10 | 10 |
| Phenolic resin (14) | | 24.4 | — | — | — | — |
| Phenolic resin (15) | | — | 23.0 | — | 33.8 | — |
| Phenolic resin (16) | | — | — | 20.5 | — | 30.9 |
| Triphenyl phosphine | | 1.0 | 1.0 | 1.0 | 1.0 | 1.0 |
| Dicumyl peroxide | | 0.4 | 0.4 | 0.4 | — | — |
| Spiral flow, inch | | 31 | 30 | 29 | 30 | 29 |
| Flexural strength, kg/mm$^2$ | | 3.5 | 3.4 | 1.7 | 1.6 | 1.5 |
| Flexural modulus, kg/mm$^2$ | | 130 | 128 | 130 | 140 | 142 |
| Tg, °C. | | 225 | 223 | 206 | 165 | 164 |
| $\alpha$, $10^{-5}$/°C. | | 1.41 | 1.42 | 1.41 | 1.45 | 1.44 |
| Crack resistance | 85° C./85% RH 24 hr. | 0/20 | 0/20 | 20/20 | 2/20 | 3/20 |
|  | 85° C./85% RH 48 hr. | 0/20 | 0/20 | — | 20/20 | 20/20 |
| Moisture resistance | | 0/40 | 0/40 | 25/40 | 36/40 | 35/40 |
| Water absorption, % | | 0.56 | 0.57 | 0.70 | 0.51 | 0.53 |

As seen from Tables 1 to 3, thermosetting resin compositions in which an imide compound having a maleimide group is blended with resins having a double bond conjugated with an aromatic group and a naphthalene ring (Examples 1 to 15) are improved in Tg, flexural strength at high temperature, crack resistance, moisture resistance and water absorption over thermosetting resin compositions free of such a double bond or naphthalene ring-containing resin (Comparative Examples 1 to 6).

Although some preferred embodiments have been described, many modifications and variations may be made thereto in the light of the above teachings. It is therefore to be understood that within the scope of the appended claims, the invention may be practiced otherwise than as specifically described.

We claim:

1. A thermosetting resin composition comprising
(A) an imide compound having a maleimide group of the formula (I):

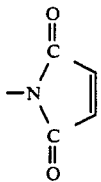 (I)

(B) a resin having at least two epoxy groups in a molecule, and
(C) a resin having a phenolic hydroxyl group in a molecule, wherein at least one of components (B) and (C) has a double bond conjugated with a naphthalene ring, components (B) and (C) are present in a total amount of about 20 to about 400 parts by weight per 100 parts by weight of component (A), the naphthalene ring is present in an amount of at least about 10% by weight, based on the total weight of components (B) and (C), and the functional group ratio B'/A' is from 0.1 to 2, wherein component (A) contains A' mol of the unsaturated bond in the maleimide group and components (B) and (C) together contain B' mol of a vinyl group as a double bond conjugated with a naphthalene ring.

2. The thermosetting resin composition of claim 1 which further comprises (D) a copolymer obtained by reacting an aromatic polymer with an organopolysiloxane having the compositional formula [II]:

$$R_a^1 R_b^2 SiO_{(4-a-b)/2} \quad [II]$$

wherein $R^1$ is a hydrogen atom, hydroxyl group, alkoxy group, or monovalent organic group containing an amino, epoxy, hydroxyl or carboxyl group, $R^2$ is a substituted or unsubstituted monovalent organic group, and letters a and b are positive numbers satisfying $0.001 \leq a \leq 1$, $1 \leq b \leq 3$, and $1.001 \leq a+b \leq 4$, and wherein the number of silicon atoms said organopolysiloxane has in its molecule is an integer of 1 to 1000 and the number of functional groups represented by $R^1$ directly attached to silicon atoms of said organopolysiloxane in its molecule is an integer of at least 1.

3. The composition of claim 1 wherein the imide compound is a compound having an N-substituted maleimide group of the formula [III]:

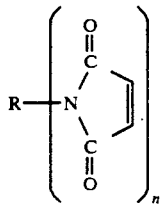 [III]

wherein R is an n-valent organic group and n is an integer of from 1 to 20.

4. The composition of claim 1 wherein the imide compound is selected from the group consisting of N-substituted trimaleimides and N-substituted bismaleimides.

5. The composition of claim 1 wherein component (B) is an epoxy resin having at least two epoxy groups, and at least one double bond conjugated with at least one naphthalene ring.

6. The composition of claim 1 wherein component (C) is a phenolic resin having at least one phenolic hydroxyl group, and at least one double bond conjugated with at least one naphthalene ring.

7. The composition of claim 1 wherein the double bond conjugated with a naphthalene ring is a propenyl group.

8. The resin composition of claim 1, wherein the functional group ratio, B'/A', is from 0.3 to 1.0.

* * * * *